(12) United States Patent
Cui

(10) Patent No.: US 11,797,674 B2
(45) Date of Patent: Oct. 24, 2023

(54) METHOD AND APPARATUS FOR DEFENDING AGAINST ATTACKS, DEVICE AND STORAGE MEDIUM

(71) Applicant: APOLLO INTELLIGENT CONNECTIVITY (BEIJING) TECHNOLOGY CO., LTD., Beijing (CN)

(72) Inventor: Zhiyang Cui, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 213 days.

(21) Appl. No.: 17/124,557

(22) Filed: Dec. 17, 2020

(65) Prior Publication Data
US 2021/0192044 A1   Jun. 24, 2021

(30) Foreign Application Priority Data
Jun. 28, 2020   (CN) .......................... 202010597499.4

(51) Int. Cl.
*G06F 21/56*   (2013.01)
*G06F 21/54*   (2013.01)
(Continued)

(52) U.S. Cl.
CPC ............ *G06F 21/566* (2013.01); *G06F 21/54* (2013.01); *G06F 21/554* (2013.01);
(Continued)

(58) Field of Classification Search
CPC ...... G06F 21/566; G06F 21/54; G06F 21/554; G06F 21/556; H04L 63/1416;
(Continued)

(56) References Cited

U.S. PATENT DOCUMENTS

2015/0113638 A1* 4/2015 Valasek ................. G06F 21/562
726/22
2015/0150124 A1   5/2015 Zhang et al.
(Continued)

FOREIGN PATENT DOCUMENTS

CN            1719783 A    1/2006
CN          105553946 A    5/2016
(Continued)

OTHER PUBLICATIONS

Tyree, Zachariah; Bridges, Robert A.; Combs, Frank L.; Moore, Michael R.; "Exploiting the Shape of CAN Data for In-Vehicle Intrusion Detection," 2018 IEEE 88th Vehicular Technology Conference (VTC—Fall), Chicago, IL, USA, 2018, pp. 1-5, doi: 10.1109/VTCFall.2018.8690644.*

(Continued)

*Primary Examiner* — Victor Lesniewski
(74) *Attorney, Agent, or Firm* — DILWORTH IP, LLC

(57) ABSTRACT

The present disclosure discloses a method, apparatus, device, and storage medium for defending against attacks, which relate to the technical field of information security, and can be used in intelligent traffic or an autonomous driving scenario. The specific implementation solution is: acquiring an instruction set including at least one instruction for controlling vehicle state; comparing each instruction in the instruction set with at least one attack instruction in an attack behavior knowledge base respectively to determine a maximum similarity value corresponding to each instruction; and determining the type of the instruction and of the processing tactics for the instruction according to the maximum similarity value corresponding to each instruction and a preset similarity range.

14 Claims, 14 Drawing Sheets

(51) Int. Cl.
*G06F 21/55* (2013.01)
*H04L 12/40* (2006.01)

(52) U.S. Cl.
CPC .......... *H04L 12/40013* (2013.01); *H04L 2012/40215* (2013.01); *H04L 2012/40273* (2013.01)

(58) Field of Classification Search
CPC ........ H04L 63/1441; H04L 12/40013; H04W 4/40; H04W 12/12
See application file for complete search history.

(56) References Cited

U.S. PATENT DOCUMENTS

| | | | |
|---|---|---|---|
| 2016/0021127 A1* | 1/2016 | Yan ................. | H04W 12/08 726/23 |
| 2017/0063996 A1* | 3/2017 | Kaster .............. | H04L 63/1441 |
| 2018/0069876 A1 | 3/2018 | Ben Ezra et al. | |
| 2018/0189483 A1* | 7/2018 | Litichever ......... | H04L 67/12 |
| 2018/0300477 A1* | 10/2018 | Galula .............. | H04L 63/1416 |
| 2019/0036946 A1 | 1/2019 | Ruvio et al. | |
| 2019/0036948 A1 | 1/2019 | Appel et al. | |
| 2019/0149561 A1* | 5/2019 | Maeda .............. | B60R 16/0232 726/23 |
| 2019/0342322 A1 | 11/2019 | Boulton | |
| 2019/0356685 A1* | 11/2019 | Naserian ........... | H04W 4/40 |
| 2019/0367041 A1* | 12/2019 | Nakano ............. | G06F 21/552 |
| 2020/0143053 A1* | 5/2020 | Gutierrez .......... | G06F 21/566 |
| 2020/0213351 A1* | 7/2020 | Shin ................. | H04L 12/40 |
| 2020/0274892 A1* | 8/2020 | Kim ................. | H04L 9/0897 |
| 2021/0006571 A1 | 1/2021 | Yi et al. | |
| 2021/0021610 A1* | 1/2021 | Ahire ............... | H04L 67/12 |
| 2021/0144026 A1* | 5/2021 | Stein ................ | G06F 21/554 |

FOREIGN PATENT DOCUMENTS

| | | |
|---|---|---|
| CN | 105871816 A | 8/2016 |
| CN | 107360175 A | 11/2017 |
| CN | 108200042 A | 6/2018 |
| CN | 108881267 A | 11/2018 |
| CN | 108924835 A | 11/2018 |
| CN | 110753321 A | 2/2020 |
| CN | 111885060 A | 11/2020 |
| CN | 108924835 B | 8/2021 |
| JP | 2013232716 A | 11/2013 |
| JP | 2017112594 A | 6/2017 |
| JP | 2018092613 A | 6/2018 |
| JP | 2018182724 A | 11/2018 |
| WO | 2018121675 A1 | 7/2018 |
| WO | 2019157943 A1 | 8/2019 |

OTHER PUBLICATIONS

Choi, Wonsuk; Jo, Hyo Jin; Woo, Samuel; Chun, Ji Young; Park, Jooyoung; Lee, Dong Hoon; "Identifying ECUs Using Inimitable Characteristics of Signals in Controller Area Networks," in IEEE Transactions on Vehicular Technology, vol. 67, No. 6, pp. 4757-4770, Jun. 2018, doi: 10.1109/TVT.2018.2810232.*
Song, Hyun Min; Kim, Ha Rang; Kim, Huy Kang; "Intrusion detection system based on the analysis of time intervals of CAN messages for in-vehicle network," 2016 International Conference on Information Networking (ICOIN), Kota Kinabalu, Malaysia, 2016, pp. 63-68, doi: 10.1109/ICOIN.2016.7427089.*
Hafeez, A.; Topolovec, K.; Awad, S.; "ECU Fingerprinting through Parametric Signal Modeling and Artificial Neural Networks for In-vehicle Security against Spoofing Attacks," 2019 15th International Computer Engineering Conference (ICENCO), Cairo, Egypt, 2019, pp. 29-38, doi: 10.1109/ICENCO48310.2019.9027298.*
Partial European Search Report in EP Patent Application No. 20217279.7 dated May 31, 2021.
European Search Report in EP Patent Application No. 20217279.7 dated Oct. 1, 2021.
First Office Action in JP Patent Application No. 2021-032545 dated Sep. 7, 2022.
First Office Action in CN Patent Application No. 202010597499.4 dated Mar. 4, 2023.
Notice of Registration Procedure issued in Chinese Patent Application No. 202010597499.4, dated Aug. 8, 2023.

* cited by examiner

METHOD AND APPARATUS FOR DEFENDING AGAINST ATTACKS, DEVICE AND STORAGE MEDIUM

CROSS-REFERENCE TO RELATED APPLICATION

This application claims priority to Chinese Patent Application No. 202010597499.4, filed on Jun. 28, 2020, which is hereby incorporated by reference in its entirety.

TECHNICAL FIELD

The embodiments of the present disclosure relate to the technical field of information security in the technical field of data processing and, in particular, to a method and an apparatus for defending against attacks, a device and a storage medium.

BACKGROUND

With the development of Internet of Vehicle (IoV) technology, there are more and more smart vehicles. For example, after smart vehicles are connected to the network, real-time road navigation, video and audio download, voice interaction and other functions are available. However, IoV not only brings convenience to life and travel of users, but also may add many potential security risks. For example, criminals can attack any connected vehicle through the network, steal in-car data, and even seize driving control, thereby posing a threat to human life and property safety.

In the prior art, the common solution for improving the information security of IoV is as follows: the vehicle terminal sends the collected external data to the cloud server or PC terminal, then uses the cloud server or PC terminal to perform security analysis on the received external data to determine whether there is attack data in the external data, and finally sends the determination result to the on-board terminal, so that the on-board terminal can determine the subsequent operation.

SUMMARY

The present disclosure provides a method and an apparatus for defending against attacks, a device and a storage medium.

There is provided a method for defending against attacks according to a first aspect of the present disclosure, including:

acquiring an instruction set, where the instruction set includes: at least one instruction for controlling state of a vehicle;

comparing each instruction in the instruction set with at least one attack instruction in an attack behavior knowledge base respectively to determine a maximum similarity value corresponding to each instruction, where each attack instruction is acquired by performing attack analysis onto a chained data set of at least one on-board component; and for any instruction in the instruction set, determining a type of the instruction and processing tactics for the instruction according to the maximum similarity value corresponding to the instruction and a preset similarity range.

There is provided a method for defending against attacks according to a second aspect of the present disclosure, including:

receiving a data set sent by an on-board terminal, where the data set includes: source data corresponding to at least one suspicious instruction, associated data of the source data and a vehicle inspection report;

for each suspicious instruction, analyzing chained data of the suspicious instruction based on the source data corresponding to the suspicious instruction, associated data of the source data and the vehicle inspection report, and determining an attack analysis result of the suspicious instruction, where the attack analysis result is used to indicate whether the suspicious instruction is actually an illegal instruction or a safe instruction; and sending the attack analysis result of the suspicious instruction to the on-board terminal.

There is provided an apparatus for defending against attacks according to a third aspect of the present disclosure, including: an acquisition module, a processing module and a determination module; where, the acquisition module is configured to acquire an instruction set, the instruction set includes: at least one instruction for controlling state of a vehicle;

the processing module is configured to compare each instruction in the instruction set with at least one attack instruction in an attack behavior knowledge base respectively to determine a maximum similarity value corresponding to each instruction, where each attack instruction is acquired by performing attack analysis on a chained data set of at least one on-board component; and the determining module is configured to, with regard to any instruction in the instruction set, determine a type of the instruction and processing tactics for the instruction according to the maximum similarity value corresponding to the instruction and a preset similarity range.

There is provided an apparatus for defending against attacks according to a fourth aspect of the present disclosure, including: a receiving module, a processing module and a sending module; where, the receiving module is configured to receive a data set sent by an on-board terminal, where the data set includes: source data corresponding to at least one suspicious instruction, associated data of the source data, and a vehicle inspection report;

the processing module is configured to, with regard to each suspicious instruction, analyze chained data of the suspicious instruction based on the source data corresponding to the suspicious instruction, associated data of the source data and the vehicle inspection report, and determine an attack analysis result of the suspicious instruction, where the attack analysis result is used to indicate whether the suspicious instruction is actually an illegal instruction or a safe instruction; and the sending module is configured to send the attack analysis result of the suspicious instruction to the on-board terminal.

There is provided an on-board terminal according to a fifth aspect of the present disclosure, including:

at least one processor; and a memory communicatively connected with the at least one processor; where, the memory stores instructions executable by the at least one processor, and the instructions are executed by the at least one processor, so that the at least one processor can execute the method according to the first aspect.

There is provided a cloud server according to a sixth aspect of the present disclosure, including:

at least one processor; and a memory communicatively connected with the at least one processor; where, the memory stores instructions executable by the at least one processor, and the instructions are executed by the at least one processor, so that the at least one processor can execute the method according to the second aspect.

There is provided a non-transitory computer-readable storage medium according to a seventh aspect of the present disclosure, where the computer instructions are used for causing a computer to execute the method according to the first aspect.

There is provided a non-transitory computer-readable storage medium according to an eighth aspect of the present disclosure, where the computer instructions are used for causing the computer to execute the method according to the second aspect.

There is provided a method for defending against attacks according to a ninth aspect of the present disclosure, including:

comparing an acquired external instruction with at least one attack instruction in an attack behavior knowledge base, and determining whether the external instruction is an attack instruction;

blocking the attack instruction after it is determined that the external instruction is the attack instruction.

It should be understood that the content described herein is not intended to identify the key or important features of the embodiments of the present disclosure, nor is it intended to limit the scope of the present disclosure. Other features of the present disclosure will be easily understood through the following description.

BRIEF DESCRIPTION OF DRAWINGS

The accompanying drawings are used to better understand the solution, and do not constitute a limitation to the present disclosure. Where.

DESCRIPTION OF EMBODIMENTS

The exemplary embodiments of the present disclosure are described below in conjunction with the accompanying drawings, including various details of the embodiments of the present disclosure to facilitate understanding, and should be considered as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following description.

At present, with the rapid development of IoV technology, after vehicles are connected to the Internet, real-time road navigation, video and audio download, voice interactions and other functions are available. At the same time, the air conditioning, sunroof, and even the brakes and gearboxes set inside the vehicle can be controlled by a computer. However, while these functions bring convenience to people's life and travel, they also add many potential safe hazards. For example, if hackers attack any vehicle in the IOV system through the network, they may steal in-car data, or even seize driving control, and thus there may be risks of vehicle information and user information leakage and, more serious, there may be problems of personal safety and information security.

In order to improve the safety of the IoV system and prevent vehicles from being attacked, when the vehicle acquires data that is input externally, security analysis can be performed on the received external data to ensure that the instructions processed by the vehicle are legal instructions or secure instructions. At present, the acquired external data is usually sent to a cloud server or a PC terminal, and it is determined, based on the analysis result of the cloud server or the PC terminal, that the external data acquired by the vehicle has a security threat. However, in this method, the cloud server or the PC terminal can only analyze the received external data, which has the problem of low inspection accuracy.

With respect to the above problems, the embodiments of the present disclosure provide a method and an apparatus for defending against attacks, a device and a storage medium which are applied to the field of information security belonging to data processing technology, and can be used in intelligent transportation or autonomous driving scenarios to improve the accuracy of data inspection and the attack defense effect, thereby improving vehicle security and personal safety.

Figure 1:
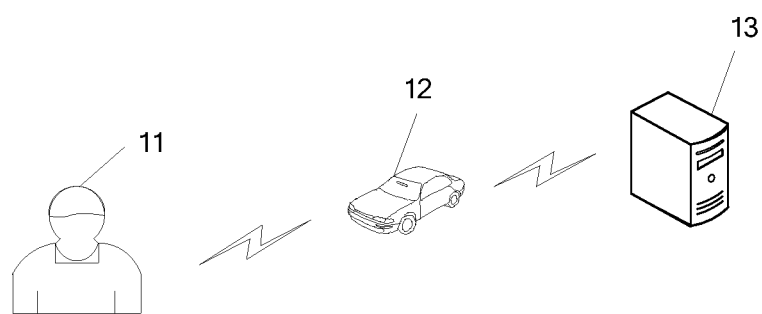
FIG. 1 is a schematic diagram of an application scenario of a method for defending against attacks provided by an embodiment of the present disclosure.

Before introducing the specific solution of the present disclosure, the application scenario of the present disclosure will be explained first. Exemplarily, FIG. 1 is a schematic diagram of an application scenario of a method for defending against attacks provided in an embodiment of the present disclosure. As shown in FIG. 1, the application scenario of the present embodiment may include: a user 11 who issues instructions, a vehicle 12 and a cloud server 13.

Where, the user 11 can issue an instruction to control the vehicle 12 through a terminal device, or issue the instruction by touching, to control the state of the vehicle 12.

An on-board terminal (not shown) is provided on the vehicle 12, and the on-board terminal can receive the control instruction issued by the user 11 to perform corresponding operations. For the vehicle 12, since the control instruction is an external instruction, the on-board terminal is required to verify the legality of the control instruction first before executing the operations of the control instruction to prevent the vehicle from being attacked.

In a possible implementation, in the embodiment of the present disclosure, when the on-board terminal cannot determine whether the received control instruction is legal or not, it can send all relevant data of the control instruction to the cloud server 13, and the cloud server 13 makes further determination.

It should be noted that FIG. 1 is only a schematic diagram of an application scenario provided by an embodiment of the present disclosure, in which a terminal device, a vehicle and a cloud server are used for explanation. The content included in the application scenario shown in FIG. 1 is not limited in the embodiments of the present disclosure, but can be set as required, which will not be repeated here.

The technical solution of the present disclosure will be described in detail through specific embodiments below. It should be noted that the following specific embodiments can be combined with each other, and the same or similar concepts or processes may not be repeated in some embodiments.

Figure 2:
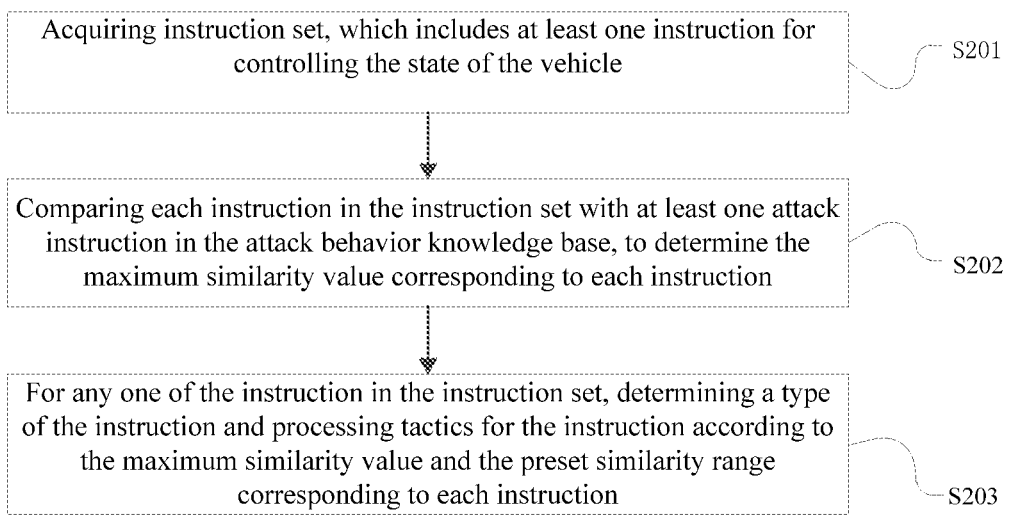
FIG. 2 is a schematic flowchart of a method for defending against attacks provided by a first embodiment of the present disclosure.

FIG. 2 is a schematic flowchart of a method for defending against attacks provided by a first embodiment of the present disclosure. The main body of execution of this method is the on-board terminal. As shown in FIG. 2, the method may include following steps:

S201, acquiring an instruction set, where the instruction set includes: at least one instruction for controlling the state of the vehicle.

In the embodiments of the present disclosure, a vehicle refers to the vehicle in the IoV system, which is usually connected to the network wirelessly, so that the user can control the vehicle with a mobile terminal which is also connected to the network.

In practical applications, the user can control the state of the vehicle in a variety of ways, for example, sending instructions to the vehicle remotely, at close range, by touch control, etc., so as to control various functions such as vehicle startup or shutdown, vehicle running or stopping, and multimedia switch-on and switch-off through the instructions. The form of the vehicle state controlled by the instruction is not limited in the embodiment of the present disclosure, which can be determined as required and will not be repeated here.

In the embodiment of the present disclosure, the on-board terminal is a component with control and processing functions mounted on the vehicle. It can directly receive external instructions, or acquire instructions from other on-board components, and then process the acquired instructions, so as to defend against external attacks.

It can be understood that, in the present embodiment, the set of all instructions acquired by the on-board terminal is called an instruction set.

S202, comparing each instruction in the above instruction set with at least one attack instruction in the attack behavior knowledge base, and determining the maximum similarity value corresponding to each instruction.

Where, each attack instruction is acquired by performing attack analysis onto the chained data set of at least one on-board component.

In the embodiment of the present disclosure, the attack behavior knowledge base may be pre-configured on the on-board terminal, which stores at least one attack instruction, where each attack instruction is obtained through processing the chained data set of each on-board component to determine the instructions it includes; and then, the information such as the possible attack entry, attack path, and attack purpose of the instruction is analyzed based on the associated data of the instruction.

Exemplarily, the attack behavior knowledge base can be the attack tactics, techniques and common knowledge (ATT&CK), also known as the attack behavior knowledge base and model, which is mainly used to evaluate attack and defense capability coverage, advanced persistent threat (APT) intelligence analysis, threat hunting, attack simulation, etc. The attack behavior knowledge base is a model that describes the technologies used in each stage of an attack from the perspective of an attacker, and it can define the behavior of an attacker in a life cycle to a level that can more effectively map itself to defense and can effectively connect the middle-level models.

In the embodiment of the present disclosure, when the on-board terminal has obtained the instruction set, for any instruction in the instruction set, the on-board terminal can perform the following operations: sequentially comparing the instruction with all attack instructions in the attack behavior knowledge base, so as to determine the similarity value between the instruction and each attack instruction, and to determine the similarity value with the biggest similarity value from all the similarity values as the similarity value corresponding to the instruction.

S203, for any instruction in the instruction set, determining a type of the instruction and processing tactics for the instruction according to the maximum similarity value and preset similarity range corresponding to the instruction.

In the embodiment of the present disclosure, the on-board terminal is pre-configured with a preset similarity range, and the upper and lower limit of the preset similarity range are used to classify the acquired instructions into different types.

Exemplarily, for any instruction in the instruction set, the maximum similarity value corresponding to the instruction determined in S202 is compared with the upper and lower limit of the preset similarity range, and the interval where the maximum similarity corresponding to the instruction is located is determined, so that the type of instruction is determined.

In a possible implementation, the on-board terminal can also be pre-set with processing tactics for different types of instructions. Therefore, after the on-board terminal determines the type of each instruction, the processing tactics for each instruction can also be determined accordingly.

In the method for defending against attacks provided by the embodiment of the present disclosure, by acquiring an instruction set (including at least one instruction for controlling the state of a vehicle), and comparing each instruction in the instruction set respectively with the at least one attack instruction in the attack behavior knowledge base, the maximum similarity value corresponding to each instruction is determined. Each attack instruction is acquired by performing attack analysis onto the chained data set of at least one on-board component. For any instruction in the instruction set, a type of the instruction and processing tactics for the instruction are determined according to the maximum similarity value and the preset similarity range corresponding to the instruction. In this technical solution, since each attack instruction in the attack behavior knowledge base is acquired by performing attack analysis onto the chained data set of the at least one on-board component, relevant data like contextual data of the external data are correlated in the process of generating the attack instruction. Therefore, the maximum similarity value of the instruction with higher accuracy can be acquired, thereby improving both the accuracy of instruction type determination and attack defense precision.

Figure 3:
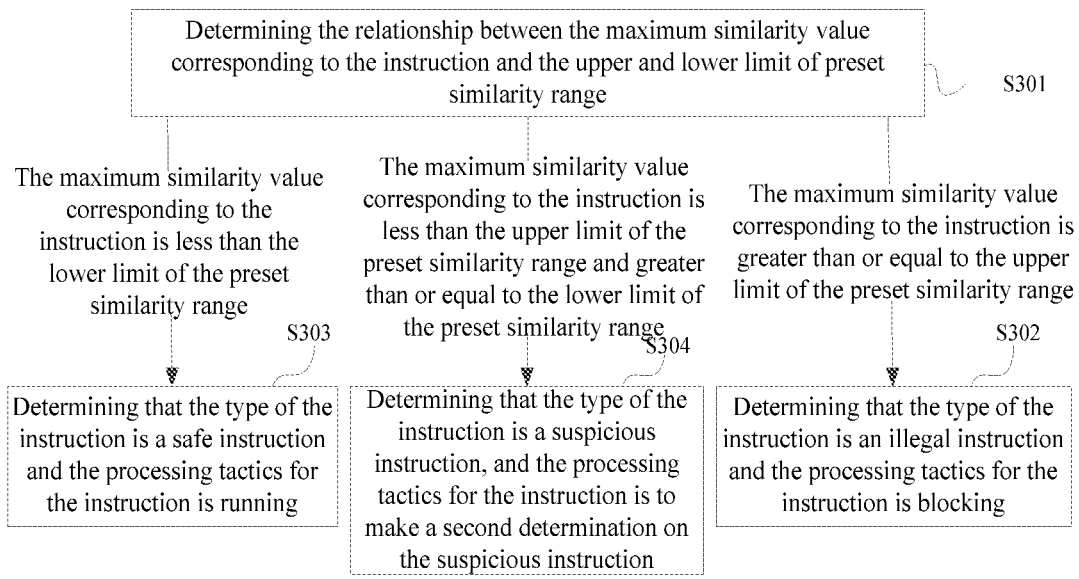
FIG. 3 is a schematic flowchart of a method for defending against attacks provided by a second embodiment of the present disclosure.

Exemplarily, on the basis of the foregoing embodiment, FIG. 3 is a schematic flowchart of the method for defending against attacks provided by a second embodiment of the present disclosure. As shown in FIG. 3, the determination of a type of the instruction and processing tactics for the instruction according to the maximum similarity value and the preset similarity range corresponding to the instruction in S203 can be achieved through the following steps:

S301, determining the relationship between the maximum similarity value corresponding to the instruction and the upper and lower limit of the preset similarity range.

In the embodiment of the present disclosure, after the on-board terminal acquires the maximum similarity value corresponding to the instruction, the maximum similarity value can be compared with the upper limit and lower limit of the preset similarity range respectively, so as to determine the relationship between the instruction and the upper and the lower limit. In a possible implementation, in the present embodiment, the upper limit of the preset similarity range is greater than the lower limit.

In a possible implementation, the upper limit and lower limit of the preset similarity range can be used to divide the similarity into different intervals, including: a first interval less than the lower limit, a second interval less than the upper limit and greater than or equal to the lower limit, and a third interval greater than the upper limit. Correspondingly, each interval can correspond to an instruction type. For example, the instruction with the maximum similarity value in the first interval is a secure instruction; the instruction with the maximum similarity value in the second interval is a suspicious instruction; and the instruction with the maximum similarity value in the third interval is an illegal instruction.

Exemplarily, the upper limit of the preset similarity range may be, for example, 80%, and the lower limit may be, for example, 30%. The specific values of the upper limit and the lower limit are not limited in the embodiment of the present disclosure, which can be determined as required and will not be repeated here.

As an example, in case that the maximum similarity value corresponding to the instruction is greater than or equal to the upper limit of the preset similarity range, S302 is performed.

S302, determining that the type of the instruction is an illegal instruction and the processing tactics for the instruction is blocking.

In this example, if the maximum similarity value corresponding to the instruction is greater than or equal to the upper limit of the preset similarity range, that is, there is an attack instruction with extremely high similarity to the instruction in the attack behavior knowledge base, the on-board terminal can determine that the type of instruction is an illegal instruction based on the above division of instructions, and accordingly, it can also determine that the processing tactics for the illegal instruction is blocking, so that the vehicle can be prevented from being attacked by such illegal instruction, thereby effectively reducing the risk that the vehicle is controlled illegally As another example, in case that the maximum similarity value corresponding to the instruction is less than the lower limit of the preset similarity range, S303 is performed.

S303, determining that the type of the instruction is a safe instruction and the processing tactics for the instruction is running.

In a possible implementation, in this example, if the maximum similarity value corresponding to the instruction is less than the lower limit of the preset similarity range, that is, the attack instruction existing in the attack behavior knowledge base has relatively low similarity to the instruction, the on-board terminal can determine that the type of instruction is a safe instruction based on the above-mentioned division of instructions, and accordingly, it can also determine that the processing tactics for the safe instruction is running, so that the vehicle can be controlled in a corresponding state.

As another example, in case that the maximum similarity value corresponding to the instruction is less than the upper limit and greater than or equal to the lower limit of the preset similarity range, S304 is performed.

S304, determining that the type of the instruction is a suspicious instruction and the processing tactics for the instruction is to perform a second determination on the suspicious instruction.

In a possible implementation, in this example, if the maximum similarity value corresponding to the instruction is less than the upper limit of the preset similarity range and greater than or equal to the lower limit of the preset similarity range, it is impossible to accurately determine whether the instruction is an illegal instruction or a safe instruction, so it is called a suspicious instruction. Correspondingly, for the suspicious instruction, the processing tactics is determined to make a second determination on the suspicious instruction to determine its actual type. By performing the second determination on the suspicious instruction, not only can the vehicle be effectively prevented from being attacked by criminals, but also can effectively avoid the occurrence of missing safety instructions.

In the method for defending against attacks provided by the embodiment of the present disclosure, in case that the maximum similarity value corresponding to the instruction is greater than or equal to the upper limit of the preset similarity range, the type of the instruction is determined to be an illegal instruction and the processing tactics for the instruction is blocking; in case that the maximum similarity value corresponding to the instruction is less than the lower limit of the preset similarity range, the type of the instruction is determined to be a safe instruction and the processing tactics for the instruction is running; in case that the value is less than the upper limit of the preset similarity range and greater than or equal to the lower limit of the preset similarity range, the type of the instruction is determined to be a suspicious instruction, and the processing tactics for the instruction is to perform a second determination on the suspicious instruction. In this technical solution, the on-board terminal is capable of determining not only the accurate instruction type, but also the appropriate processing tactics, according to the maximum similarity value corresponding to the instruction and the preset similarity range, thereby effectively avoiding the risk of vehicles being attacked and ensuring personal and property safety.

Figure 4:
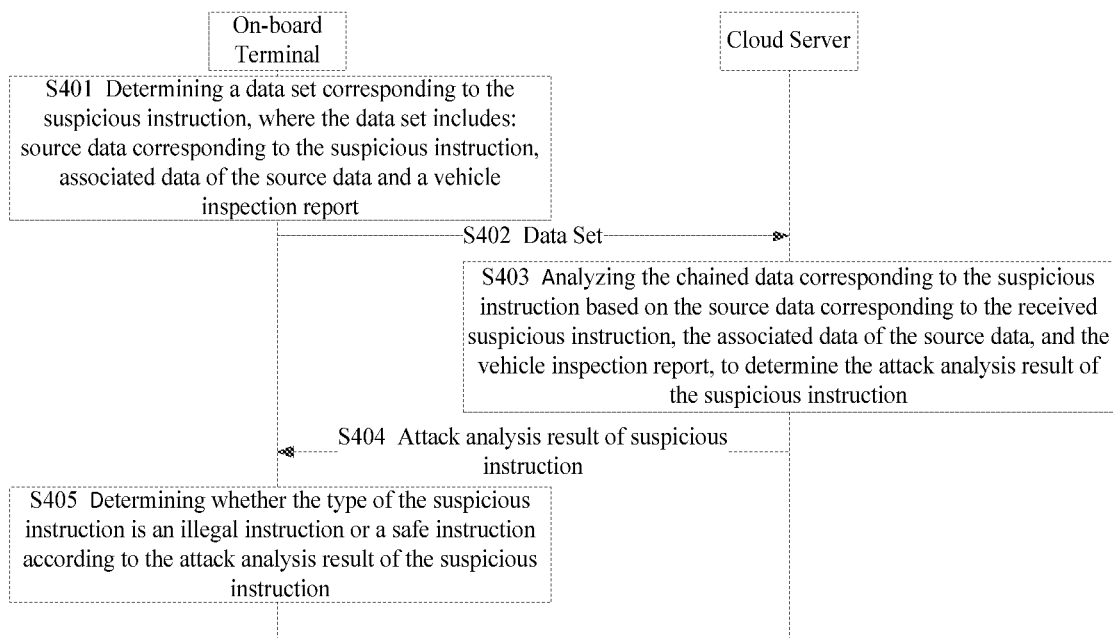
FIG. 4 is a schematic flowchart of a method for defending against attacks provided by a third embodiment of the present disclosure.

In a possible implementation, on the basis of the above embodiments, FIG. 4 is a schematic flowchart of the method for defending against attacks provided by a third embodiment of the present disclosure. The method is explained by interaction between the on-board terminal and the cloud server. As shown in FIG. 4, when the instruction is determined to be a suspicious instruction, a second determination is required for the suspicious instruction. Therefore, the method may further include the following steps:

S401, determining, by the on-board terminal, a data set corresponding to a suspicious instruction, where the data set includes: source data corresponding to the suspicious instruction, associated data of the source data and a vehicle inspection report.

In the embodiment of the present disclosure, since the instructions are standardized data, and the data does not exist alone, in different scenarios, the data has different associated data such as contextual data. Therefore, for the determined suspicious instructions, the on-board terminal first determines source data corresponding to the suspicious instruction based on the acquisition path of the suspicious instruction, and then determines associated data of the source data according to the transmission link information of the source data.

Further, in order to improve the analysis accuracy of the cloud server, the on-board terminal can also send the vehicle inspection report of the vehicle where it is mounted to the cloud server. In a possible implementation, the vehicle inspection report may include inspection results of some instructions in the instruction set, and may also include the inspection results of other aspects of the vehicle, such as, vehicle state data.

It can be understood that the data set corresponding to the suspicious instruction and the specific content included in the vehicle inspection report are not limited in the embodiment of the disclosure, which can be determined as required, and will not be repeated here.

S402, sending, by the on-board terminal, the above data set to the cloud server.

In practical applications, the detection of attack scenarios usually involves a large amount of data, and the processing procedure is usually more complicated, which requires processing components with high processing capabilities. The higher the processing capabilities of the processing components are, the greater the manufacturing cost will be. In the embodiment of the present disclosure, in order to reduce the cost of the vehicle, the detection of attack scenarios is usually performed in the cloud. Therefore, the on-board terminal can send the data set corresponding to the suspicious instruction to the cloud server, so that the cloud server can perform corresponding processing to the received data set and then determine whether the suspicious instruction is classified as an illegal instruction or a safe instruction.

In a possible implementation, for each suspicious instruction, the cloud server performs the following operations:

S403, analyzing, by the cloud server, the chained data corresponding to the suspicious instruction based on the source data corresponding to the received suspicious instruction, the associated data of the source data and the vehicle inspection report, and determining the attack analysis result of the suspicious instruction.

Where, the attack analysis result is used to indicate whether the suspicious instruction is actually an illegal instruction or a safe instruction.

In a possible implementation, in the embodiment of the present disclosure, if the on-board terminal sends at least one data set to the cloud server, the server may process each received data set, and then determine the suspicious instruction corresponding to each data set, the source data corresponding to the suspicious instruction, the associated data of the source data, the vehicle inspection report carried in the data set, etc.

Normally, after the on-board terminal sends the data set corresponding to the suspicious instruction to the cloud server, when the cloud server processes the received data set, the type of instruction corresponding to each data set can be determined finally according to subsequent attack scenarios detection.

It is understandable that the cloud server can receive the data set sent by at least one on-board terminal, and then determine, by analyzing the data set of each on-board terminal, at least one suspicious instruction corresponding to each data set and the source data corresponding to each suspicious instruction, the associated data of the source data, and other vehicle inspection reports.

Exemplarily, the cloud server may include a data processing module and an attack scenario detection module, where the data processing module may format each data in the data set and process it into a format that can be recognized by the attack scenario detection module, and provide the formatted data to the attack scenario detection module. The attack scenario detection module is used to detect new attack scenarios and improve old attack scenarios based on the received formatted data.

In an example of the present disclosure, the cloud server in S403 analyzes the chained data corresponding to the suspicious instruction based on the source data corresponding to the received suspicious instruction, the associated data of the source data and the vehicle inspection report, and determines the attack analysis result of the suspicious instruction, which can be implemented through the following steps:

A1, determining, according to the source data corresponding to the suspicious instruction and the associated data of the source data, entry information corresponding to the suspicious instruction, indication information and impact information on the vehicle.

In the embodiment of the present disclosure, the cloud server first analyzes the source data corresponding to the suspicious instruction to determine the entry information corresponding to the suspicious instruction, and then determine, according to the association relationship among data and associated data of the source data, the indication information (such as the purpose of the suspicious instruction, the control target and the transmission path) and the impact information on the vehicle.

In a possible implementation, the entry information of the suspicious instruction may include entry point information, entry mode information, etc. For example, the entry point information may refer to the chip debug port, and the entry mode information may refer to the case of entering the entry point by using a chip debug port, specifically, based on methods such as jtag and uart. The entry point information may also refer to an application, and the entry mode information may enter the entry point through the installation of a malicious application. It is understandable that the entry point information can also have other modes involving external interface utilization, radio interface utilization, supply chain attack, charging pile attack, SIM card, etc. The specific form of expression of the entry point information is not limited in the embodiments of the present disclosure do not limit, which can be extended according to actual scenarios and will not be repeated here.

In a possible implementation, the indication information can refer to the purpose of execution, scope of action, etc. For example, change the state of the program through the use of the chip debug port so as to modify the firmware (such as, tampering with the flash), tamper with the Telematics BOX (T-BOX) image on the instruction line interface through the use of an external interface, make the Man-in-the-middle attack and modify the trusted execution environment by installing malicious applications, etc. The specific content of the indication information needs to be determined according to the entry point information, which will not be repeated here.

In a possible implementation, the impact information of the suspicious instruction on the vehicle may include device data deletion, vehicle control instruction forging, etc. The specific impact needs to be determined according to the actual situation, which will not be repeated here.

A2, determining the attack analysis result of the suspicious instruction according to the entry information corresponding to the suspicious instruction, the indication information and the impact information on the vehicle.

In the embodiment of the present disclosure, the cloud server analyzes the results of the case when the on-board terminal executes the suspicious instruction request operation, according to the entry information, indication information, and impact information corresponding to the suspicious instruction determined above, and determines whether there is a risk of illegally vehicle control or vehicle information steal, and then to acquire the attack analysis result of the suspicious instruction.

In a possible implementation, the data in the attack behavior knowledge base is a chained result. According to the source data, all the contextual data of the collected source data and other information transmitted to the on-board terminal together with source data can be determined. Therefore, by analyzing the data set corresponding to the suspicious instruction, it is possible to effectively put the concepts of low abstract level (such as exploitation of vulnerability and malware) into the context for thinking, so that the attack analysis result of the suspicious instruction can be accurately determined.

It is understandable that although exploitation of vulnerability and malware are useful for an attacker's arsenal, to fully understand the usefulness of exploitation of vulnerability and malware, the context about the process of achieving their goals is required to be understood. Therefore, the actual type of the suspicious instruction can be accurately determined by linking the suspicious instruction (threat intelligence) with the event data.

S404, sending, by the cloud server, the attack analysis result of the suspicious instruction to the on-board terminal.

In the embodiment of the present disclosure, after acquiring the attack result of the suspicious instruction, the cloud server can send the attack result to the on-board terminal, so that the on-board terminal can perform corresponding operations based on the attack analysis result.

S405, determining, by the on-board terminal, whether the type of the suspicious instruction is an illegal instruction or a safe instruction, according to the attack analysis result of the suspicious instruction.

Exemplarily, since the attack analysis result can indicate the actual type of the suspicious instruction, after receiving the attack analysis result of the suspicious instruction from the cloud server, and after processing the attack analysis result into the format that can be recognized by the on-board terminal, the on-board terminal can determine whether the suspicious instruction is finally classified as an illegal instruction or a safe instruction.

In a possible implementation, after determining the specific type of the suspicious instruction, the on-board terminal may determine the corresponding processing tactics, accordingly; that is, if the suspicious instruction is a safe instruction, the on-board terminal will run the instruction to achieve the corresponding operations; if the suspicious instruction is an illegal instruction, the on-board terminal will block or intercept or detect and kill the instruction to avoid information leakage or security risk caused by the execution of the instruction.

In the method for defending against attacks provided by the embodiment of the present disclosure, the on-board terminal determines the data set corresponding to the suspicious instruction, and sends the data set to the cloud server; the cloud server, for each suspicious instruction, analyzes chained data corresponding to each suspicious instruction based on the source data corresponding to the received suspicious instruction, the associated data of the source data and the vehicle inspection report, and determines an attack analysis result of the suspicious instruction, and sends the attack analysis result to the on-board terminal, so that the on-board terminal can determine whether the type of the suspicious instruction is an illegal instruction or a safe instruction according to the attack analysis result. By means of determining the security of the current instruction by combining the source data of the suspicious instruction and the contextual data of the source data, this technical solution improves both the instruction determination accuracy and the user experience on the basis of avoiding attacks.

Figure 5:
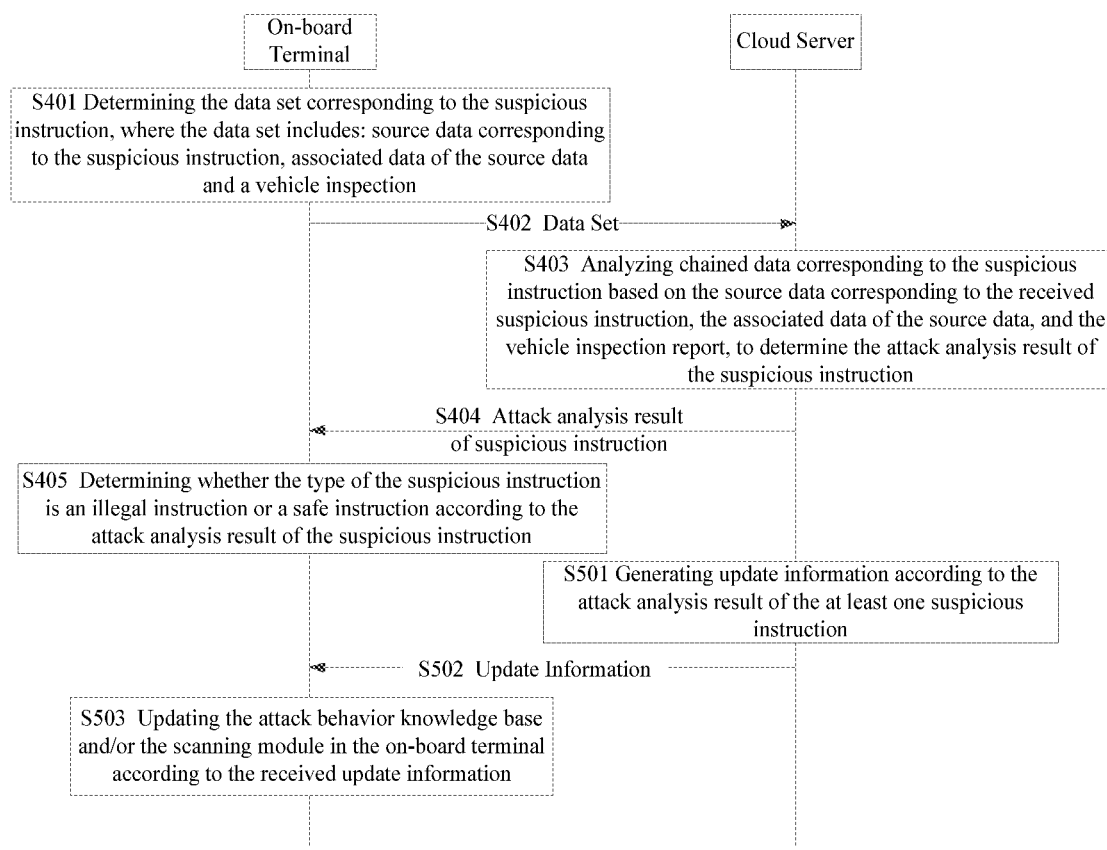
FIG. 5 is a schematic flowchart of a method for defending against attacks provided by a fourth embodiment of the present disclosure.

Exemplarily, on the basis of the above embodiment shown in FIG. 4, FIG. 5 is a schematic flowchart of the method for defending against attacks provided by a fourth embodiment of the present disclosure. As shown in FIG. 5, the method may further include the following steps:

S501, generating, by the cloud server, update information according to the attack analysis result of the at least one suspicious instruction.

Where, the update information includes the update content of the attack behavior knowledge base and/or of the scanning module in the on-board terminal.

In the embodiment of the present disclosure, after determining the attack analysis result of the suspicious instruction, the cloud server can use the actual type of the suspicious instruction indicated by the attack analysis result to generate the update content for the attack behavior knowledge base, and can also update the capability of a scanning module in the on-board terminal to improve the capability to detect the attack behavior of the scanning module. Therefore, it is also possible to generate the update content for the scanning module in the on-board terminal.

As an example, if the suspicious instruction is actually an illegal instruction, the illegal instruction and the chained data set corresponding to the illegal instruction can be used to generate the attack instruction (serving as update information of the attack behavior knowledge base) corresponding to the suspicious instruction; accordingly, based on the capability improvement point of the scanning module, the update content for the scanning module can be generated, such as, version information.

As another example, if the suspicious instruction is actually a safe instruction, at least one attack instruction in the attack behavior knowledge base can be changed based on the chained data set corresponding to the suspicious instruction, to generate update information of the attack behavior knowledge base, so that similarity values between the suspicious instruction and the at least one attack instruction are all less than the lower limit of the preset similarity range. In a possible implementation, the at least one attack instruction is an instruction in the attack behavior knowledge base whose similarity value between the suspicious instruction and the suspicious instruction is greater than the lower limit of the preset similarity range. Similarly, it is also possible to generate the update content for the scanning module based on the capability improvement point of the scanning module.

S502, sending, by the cloud server, the above update information to the on-board terminal.

S503, updating, by the on-board terminal, the attack behavior knowledge base and/or the scanning module in the on-board terminal, according to the received update information.

In a possible implementation, after generating the update content of the attack behavior knowledge base and/or the update content of the on-board terminal, the cloud server sends, in the form of providing update information, the update content to the on-board terminal, so that the on-board terminal can respectively perform content update for the attack behavior knowledge base, and/or content update and/or version update for the scanning module in the on-board terminal, based on the received update information.

In the method for defending against attacks provided by the embodiment of the present disclosure, the cloud server generates update information according to the attack analysis result of the at least one suspicious instruction, and sends the update information to the on-board terminal, so that the on-board terminal can update the attack behavior knowledge base and/or the scanning module in the on-board terminal, based on the received update information. In this technical solution, by updating the attack behavior knowledge base and/or the scanning module, the attack defense capability and defense accuracy of the on-board terminal can be improved, thereby improving the information security and personal safety of the vehicle to a certain extent.

Figure 6:
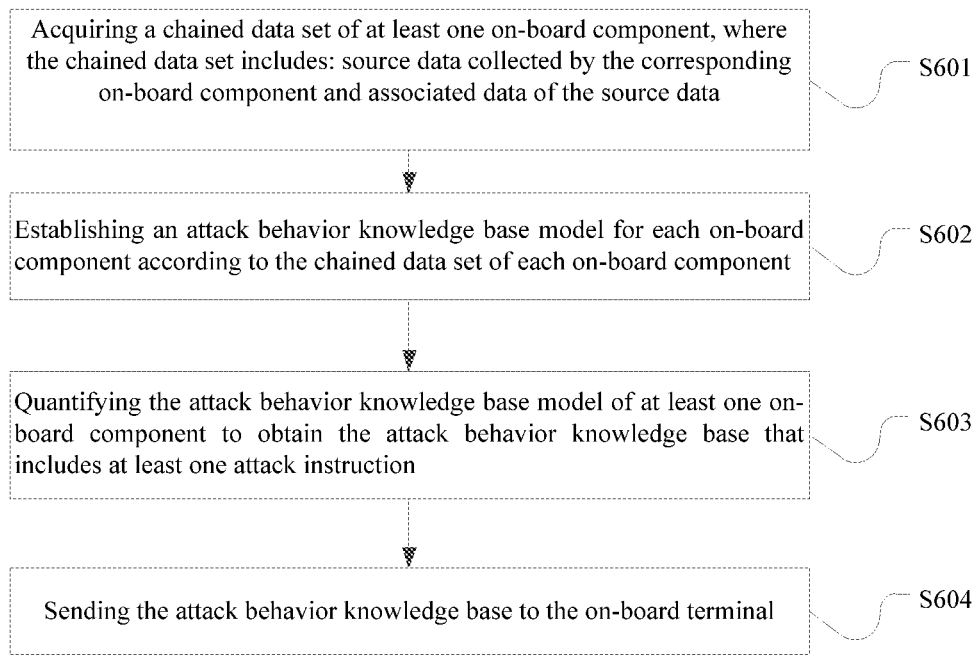
FIG. 6 is a schematic flowchart of a method for defending against attacks provided by a fifth embodiment of the present disclosure.

In a possible implementation, on the basis of the above embodiments, FIG. 6 is a schematic flowchart of the method for defending against attacks provided by a fifth embodiment of the present disclosure. As shown in FIG. 6, before the above S501, the method may further include following steps:

S601, acquiring a chained data set of at least one on-board component, where the chained data set includes: source data collected by the corresponding on-board component and associated data of the source data and associated data of the source data.

In the embodiment of the present disclosure, the cloud server may receive the chained data set of at least one on-board component from at least one on-board terminal, may also acquire the chained data set of at least one on-board component from the storage device corresponding to the on-board component, and may also acquire the chained data set of at least one on-board component by other methods. The method of acquiring the chained data set of the on-board component is not limited in the embodiment of the present disclosure, which can be determined according to actual needs and will not be repeated here.

Exemplarily, in the present embodiment, the chained data set of each on-board component may include source data collected by the on-board component itself, and may also include associated data of the source data, for example, the contextual data of the function corresponding to the source data. The specific content of the chained data set is not limited in the embodiment of the present disclosure either, and may be determined based on actual needs.

In the embodiment of the present disclosure, when there is a plurality of data of the on-board components, the plurality of on-board components may include on-board infotainment (IVI), or T-BOX, or a gateway or on-board Diagnostic (OBD). Specific types of the on-board components are not limited in the embodiment of the present disclosure and can be determined according to actual needs.

S602, establishing an attack behavior knowledge base model for each on-board component according to the chained data set of each on-board component.

In practical applications, the chained data set of each on-board component can include many aspects, such as data entry, the way the data enters the vehicle, the result and the impact of data execution.

Exemplarily, the following takes T-BOX as an example to introduce the process of establishing the attack behavior knowledge base. In a possible implementation, for the T-BOX, the formation of the attack instruction can be described from at least one of the following aspects. In a possible implementation, the above at least one aspect may include at least one of the following: entry point, entry point-sub-item, entry method, persistent information, privilege escalation, defense bypass, credential acquisition, credential access-sub-item, disclosure, lateral movement, impact, data theft, instruction and control, network impact and remote access impact.

In a possible implementation, the attack data can enter the T-BOX by the methods such as chip debug port (entry point-sub-items can be jtag, uart, etc.) utilization, external interface (entry point-sub-items can be USB, ADB, OBD, etc.) utilization, radio interface (entry points-sub-items can be cellular networks, WiFi, Bluetooth, NFC, GPS, etc.) utilization, installation of malicious applications, repackaged applications (malicious code is implanted in legitimate applications), supply chain attacks (specifically, third-party library vulnerabilities or implanted through development tools), charging piles (for charging vehicles) utilization, SIM cards (specifically, copying SIM cards), etc.

In a possible implementation, the method of generating illegal instructions based on the entered attack data can be any one of the following methods: changing the program state (that is, the execution of the program state), executing on the command line interface, executing through API, man-in-the-middle attack, file infection, scripting, and user execution.

In a possible implementation, the way of making the attack instruction persistence can be any one of the following: modifying firmware (tampering with FLASH), tampering with the T-BOX image, modifying the system partition, modifying the trusted instruction environment, modifying the operating system kernel or boot partition, code injection, modifying update process of OTA, file infection, etc.

In a possible implementation, the suspicious instruction can be elevated by using at least one of the following: operating system vulnerabilities, IEE vulnerabilities, third-party software vulnerabilities, ADB and/or serial root vulnerabilities, weak password brute force cracking vulnerabilities for root login, OTA upgrade process vulnerabilities, etc.

Exemplarily, the illegal instruction can bypass defense by at least one of the following: obfuscating or encrypting files, bypassing the upgrade package verification mechanism during firmware upgrade, bypassing the Bluetooth device pairing verification on the vehicle side, bypassing hardware safe protection measures, bypassing firewall functions, bypassing defense firmware extraction measures, bypassing access control policies, bypassing the system upgrade rollback mechanism, bypassing the ADB login mechanism, etc.

In a possible implementation, the suspicious instruction can acquire the credential by any one of the following: weak password brute force cracking (specifically, performing weak password brute force cracking on any one of root log TELNET login, SSH login, FIP/SFIP login, etc.), IEE vulnerability, access the private key (for example, acquiring the private key from the PFE certificate), etc.

In a possible implementation, the attack data can perform T-BOX based on any one of the following disclosure methods; In a possible implementation, the disclosure methods can include any one or many of the following methods: system release version disclosure, ADB service authority disclosure, determining whether the remote debugging agent pdebug disclosure retains for tNX system, determining whether the development service qconn disclosure retains for the QNX system, application APP permission disclosure, selinux usage disclosure, sensitive file access control authority disclosure, T-BOX circuit board disclosure, type of WiFi module support algorithm disclosure, known vulnerability of chip disclosure, known vulnerability of third-party library disclosure, sensitive information of firmware disclosure, sensitive information of system and application log disclosure, bypassing analysis environment disclosure, iptables disclosure, switch port list disclosure, process list disclosure, program upload disclosure and location identification disclosure.

In a possible implementation, the illegal instruction can act on other components (lateral movement) through utilization of ISP's APN network, thereby generating impacts such as erasing device data and forging vehicle control instructions.

In a possible implementation, the illegal instruction can steal data in any one of the following ways, such as, analyzing sensitive information in V2X communication, analyzing private keys of various algorithms, acquiring firmware upgrade packages from the OTA upgrade process, analyzing sensitive data in device logs, and analyzing sensitive data or credentials in files.

In a possible implementation, the illegal instruction can generate instructions and control in any one of the following ways, such as, standard encryption protocol, system port, DDOS, program status change, disguise, control logic modification, parameter modification, program download, unauthorized command messages, fraudulent messages, etc. Where, the instruction and control sub-items corresponding to the fraudulent message may include any one of the following methods: 1, forging V2X communication node to attack the target vehicle; 2, tampering with the communication content between the V2X communication nodes; 3, forging T-BOX communication with cloud TSP; 4, tampering with the communication data between T-BOX and TSP; 5, replaying T-BOX monitoring port application layer messages; 6, replaying short messages and signaling; 7, replaying the CAN instruction issued by the MCU module on the T-BOX; 8, replaying the communication between the T-BOX and the TSP.

In a possible implementation, execution of the illegal instruction may cause network impacts such as deleting device data and controlling vehicles, as well as cause remote service impacts such as acquiring device cloud backups, unauthorized remote control of vehicles, unauthorized remote erasure of data and unauthorized remote tracking device.

In the embodiment of the present disclosure, the cloud server can start, based on at least two of the aspects related to T-BOX (entry points, entry points sub-items, entry modes, persistent information, privilege escalation, defense bypass, credentials acquisition, credential access-sub-items, disclosure, lateral movement, impact, data theft, instruction and control, network impact, remote access impact) and based on permutation and combination of the at least one mode for each aspect, to establish the association relationship among the attack data, each associated data and the attack instruction, and thus acquiring the attack behavior knowledge base model of T-BOX. The specific implementation of each attack instruction in the attack behavior knowledge base model of T-BOX is not limited in the embodiment of the present disclosure, which can be set as required and will not be repeated here.

It is understandable that the above describes the process of establishing the attack behavior knowledge base model of T-BOX, and the establishment of the attack behavior knowledge base model of other on-board components (e.g., IVI, gateway and OBD) is similar and will not be repeated here.

S603, quantifying the attack behavior knowledge base model of at least one on-board component, to acquire the attack behavior knowledge base that includes at least one attack instruction.

In the present embodiment, after the cloud server acquires the attack behavior knowledge base model of at least one on-board component, in order to improve efficiency in the subsequent processing procedure, the attack behavior knowledge base model of each on-board component can be quantified, to acquire at least one attack instruction; and then the attack instructions corresponding to the attack behavior knowledge base model of all on-board components are integrated and processed, to acquire the attack behavior knowledge base, that is the ATT&CK knowledge base.

S604, sending the attack behavior knowledge base to the on-board terminal.

In a possible implementation, the server can send the attack behavior knowledge base to the on-board terminal, so that when the on-board terminal receives the instruction set, it can determine whether the received instruction is legal or not based on the attack instruction in the attack behavior knowledge base. It is understandable that the cloud server only needs to send the attack behavior knowledge base to the on-board terminal when the attack behavior knowledge base is first established, and then only needs to send the update information to the on-board terminal instead of sending the full content, which reduces the transmission cost.

The method for defending against attacks provided by the embodiments of the present disclosure, acquires a chained data set of at least one on-board component, where the chained data set includes source data collected by the corresponding on-board component and associated data of the source data, establishes the attack behavior knowledge base model of each on-board component according to the chained data set of each on-board component, quantifies the attack behavior knowledge base model of at least one on-board component to acquire the attack behavior knowledge base, and sends the attack behavior knowledge base to the on-board terminal. In this technical solution, by sending the established attack behavior knowledge base to the on-board terminal, the on-board terminal can directly determine the instruction when it receives the instruction, which improves inspection efficiency on the basis of ensuring the determination accuracy.

Figure 7:
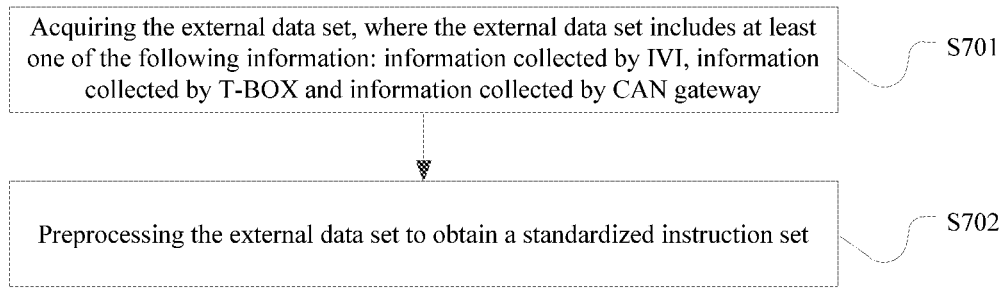
FIG. 7 is a schematic flowchart of a method for defending against attacks provided by a sixth embodiment of the present disclosure.

In a possible implementation, on the basis of the above embodiments, FIG. 7 is a schematic flowchart of the method for defending against attacks provided by a sixth embodiment of the present disclosure. As shown in FIG. 7, the above S201 can be implemented through following steps:

S701, acquiring the external data set, where the external data set includes at least one of the following information: information collected by IVI, information collected by T-BOX and information collected by CAN gateway.

In practical applications, IVI is an on-board integrated information processing system, which adopts an on-board dedicated central processing unit and is formed based on the body bus system and Internet services. Therefore, the illegal instruction may enter the vehicle through the vehicle body bus system and the Internet, and the on-board terminal can acquire external data through IVI.

The on-board T-BOX is a component of the IoV system, and is mainly used to communicate with the backstage system/mobile APP to realize the display and control of vehicle information in the mobile APP. Since vehicles can access the TSP server according to the specified protocol through T-BOX, and send and receive data, criminals can implant viruses or programs through this data channel to gain control of the vehicle, there may be a risk of invading the ECU by attacking TBOX. Therefore, the on-board terminal can acquire external data set through T-BOX.

The gateway (CAN gateway) is connected to the bus system; in this way, other communication systems are allowed to access the CAN network through this gateway, thereby mapping the protocol to another communication model. Therefore, attack data may also enter the vehicle through the gateway, and the on-board terminal can acquire the information collected by the gateway.

It can be understood that the source of the external data set is not limited in the embodiment of the present disclosure. For example, data acquired from an OBD device is acceptable. The specific source of the external data set can be determined according to the actual scenario, which will not be repeated here.

S702, preprocessing the external data set to acquire a standardized instruction set.

In the embodiment of the present disclosure, the external data set may be remote data, near-field data or contact data. Where, the remote data may be used for controlling the state of the vehicle through remote instructions, the near-field data may be used for connecting the vehicle through the radio interface within the short distance range and sending out control information, and the contact data can be the operation of starting or shutting down the vehicle through the button on the vehicle. The expression form of the external data set is not limited in the present disclosure.

The method for defending against attacks provided by the embodiment of the present disclosure, by means of acquiring an external data set, preprocessing the external data set to acquire a standardized instruction set, and then processing the external data set into a form that can be recognized by the on-board terminal, provides realization possibility for subsequent determination of the instruction type.

The above introduces the technical solution of the present disclosure, and the solution of the present disclosure will be explained by specific embodiments below.

Figure 8:
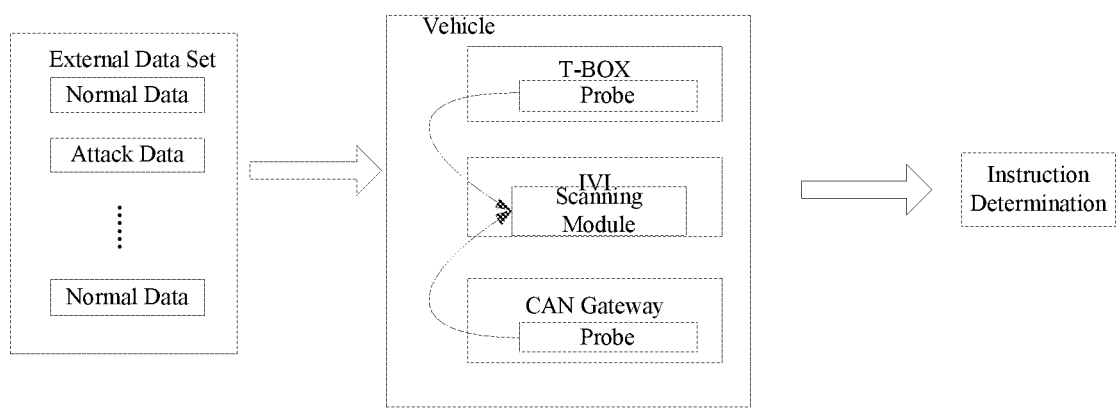
FIG. 8 is a schematic structural diagram of an on-board terminal for defending against attacks provided by an embodiment of the present disclosure.

FIG. 8 is a schematic structural diagram of an on-board terminal for defending against attacks provided by an embodiment of the present disclosure. As shown in FIG. 8, the on-board terminal can acquire the external data set through IVI, T-BOX and CAN gateways. In a possible implementation, the vehicle can acquire the external data set through scanning modules deployed on IVI, probes deployed on T-BOX and CAN gateways, etc. Where the external data set may include normal data, attack data, etc.

In the embodiment of the present disclosure, the scanning module on the IVI can receive the data transmitted by the T-BOX and CAN gateway, and combine the data collected by the scanning module to perform attack determination on the external data set, so as to protect the vehicle to be safe.

Figure 9:
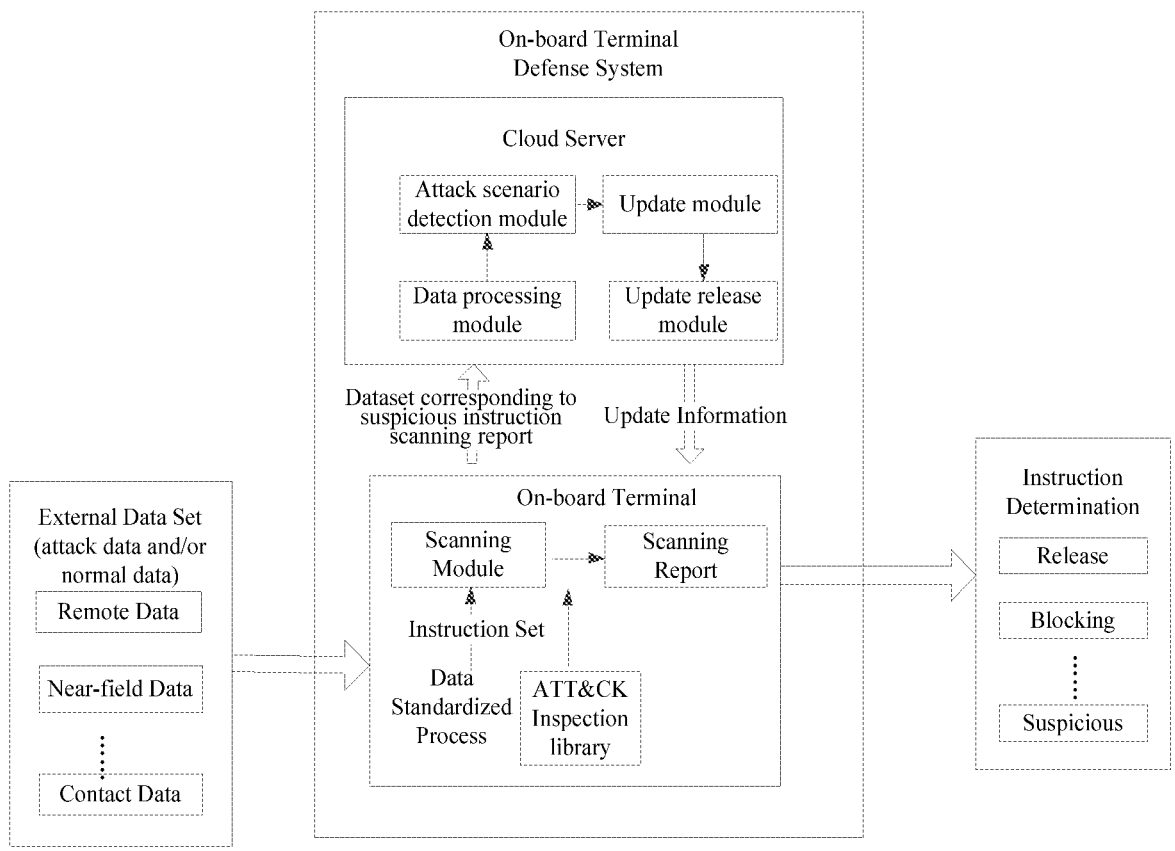
FIG. 9 is a schematic structural diagram of an on-board terminal defense system provided by an embodiment of the present disclosure.

Further, the embodiment of the present disclosure also provides an on-board terminal defense system. Exemplarily, FIG. 9 is a schematic structural diagram of an on-board terminal defense system provided by an embodiment of the present disclosure. As shown in FIG. 9, the system may include the on-board terminal and cloud server. Where the on-board terminal can perform data standardization processing on the external data set to acquire the instruction set, and then input the instruction set into the scanning module for type determination. In a possible implementation, the scanning module can combine the ATT&CK inspection library to perform attack determination on the input instruction set, so as to acquire a scanning report.

In a possible implementation, the external data set (attack data and/or normal data) mainly includes remote data, near-field data and contact data.

Specifically, the scanning module compares the above instruction set with at least one attack instruction in the ATT&CK inspection library to acquire a maximum similarity value. For example, in case that the maximum similarity value is greater than or equal to 80%, the type of the instruction is determined to be an illegal instruction, and the instruction is blocked; in case that the maximum similarity value is less than 30%, the type of the instruction is determined to be a safe instruction and the instruction is released; in case that the maximum similarity value is greater than or equal to 30% and less than 80%, the type of the instruction is determined to be a suspicious instruction. At this time, it is necessary to determine the data set formed by the source data, the context data corresponding to the suspicious instruction/instruction set and other vehicle inspection result, and report the data set to the cloud server.

In a possible implementation, the cloud server may include a data processing module, an attack scenario detection module, an update module (a scanning module used for updating the attack behavior knowledge base and/or the on-board terminal), and an update release module. Where, the data processing module can receive both the data set corresponding to the suspicious instruction sent by the on-board terminal and the vehicle scan report, format the data set and the vehicle scan report, send the processed data to the attack scenario detection module for new attack scenario detection and old attack scenario perfection, determine the attack analysis result of the suspicious instruction, update the ATT&CK inspection library and scanning module by the update module to generate the update information, and finally release the update information to the on-board terminal through the update release module, so that the on-board terminal updates the ATT&CK inspection library and scanning module based on the received update information.

In a possible implementation, in practical applications, the vehicle automatically detects whether there is an update release of the ATT&CK inspection library and scanning module every time the vehicle is started. If so, update is performed prior to detection; if not, detection is directly performed. The scanning module in the vehicle records the inspection log of the vehicle from each startup to shutdown, and uploads the inspection log to the cloud regularly to provide a verification evidence for the attack scenario detection module.

Figure 10:
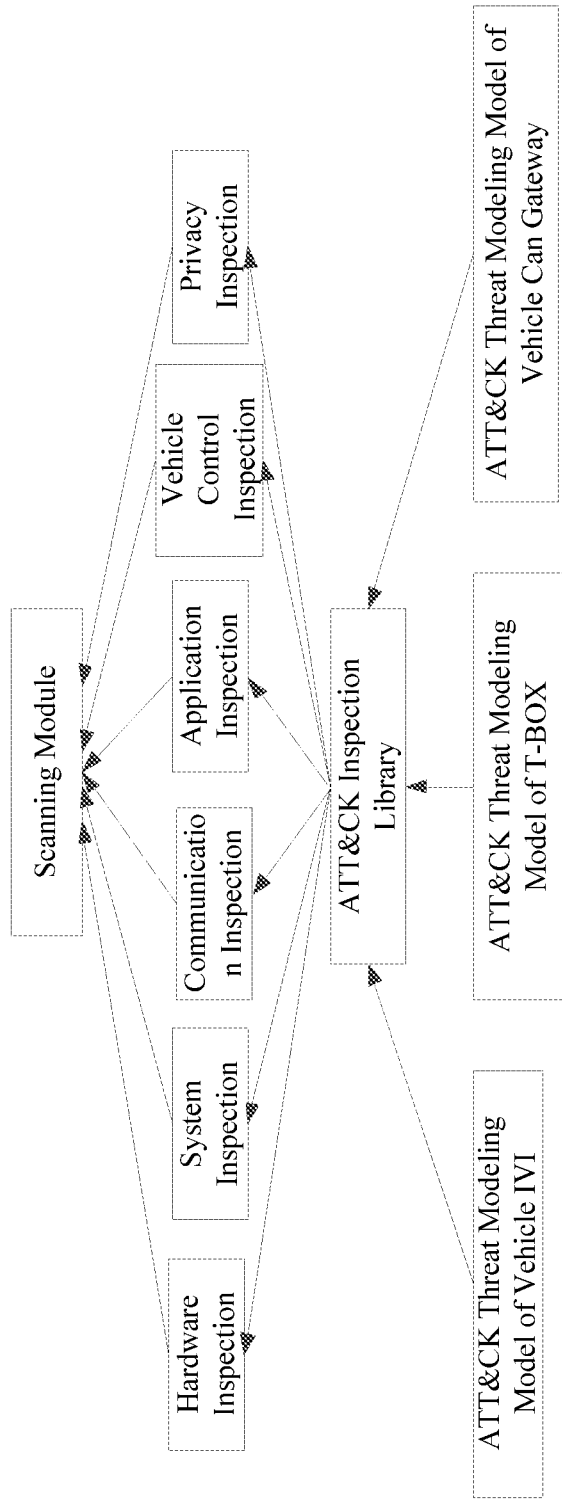
FIG. 10 is a block diagram of a process of establishing and using an attack behavior knowledge base.

Exemplarily, FIG. 10 is a block diagram of a process of establishing and using an attack behavior knowledge base. As shown in FIG. 10, the cloud server firstly establishes the ATT&CK threat modeling model of the vehicle IVI according to the acquired chained data set of the vehicle IVI, establishes the ATT&CK threat modeling model of the vehicle T-BOX based on the acquired chained data set of the vehicle T-B OX, and establishes the ATT&CK threat modeling model of the vehicle CAN gateway based on the acquired chained data set of the vehicle CAN gateway; secondly, the cloud server quantifies the ATT&CK threat modeling model of vehicle IVI, ATT&CK threat modeling model of vehicle T-BOX and ATT&CK threat modeling model of the vehicle CAN gateway, to acquire an ATT&CK inspection library, and synchronizes the ATT&CK inspection library to the on-board terminal. Correspondingly, the scanning module of on-board terminal can, based on ATT&CK inspection library, perform inspection from the aspects such as hardware inspection, system inspection, communication inspection, application inspection, vehicle control inspection and privacy inspection, and acquire the inspection result.

It is understandable that, in the embodiment of the present disclosure, the ATT&CK inspection library includes ATT&CK threat modeling model of a plurality of on-board components, and each model will be updated iteratively, which will not be limited in the embodiments of the present disclosure.

It can be seen from the above analysis that the method for defending against attacks provided by the embodiments of the present disclosure can complete attack determination on the external instruction set through the cooperation of the cloud server and the on-board terminal, thereby protecting the vehicle to be safe.

The above describes the specific implementation of the method for defending against attacks mentioned in the embodiments of the present disclosure. The following are apparatus embodiments of the present disclosure, which can be used to execute the method embodiments of the present disclosure. For details not disclosed in the apparatus embodiments of the present disclosure, please refer to the method embodiments of the present disclosure.

Figure 11:
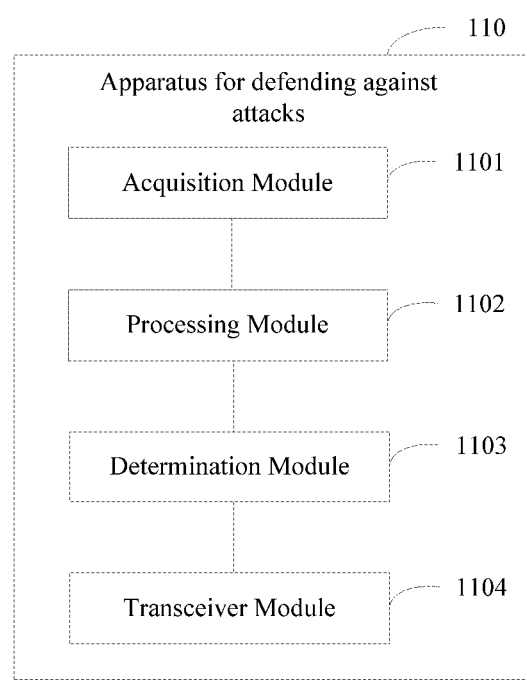
FIG. 11 is a schematic structural diagram of an apparatus for defending against attacks provided by the first embodiment of the present disclosure.

FIG. 11 is a schematic structural diagram of an apparatus for defending against attacks provided by the first embodiment of the present disclosure. The apparatus can be integrated into an on-board terminal, or implemented through the on-board terminal. As shown in FIG. 11, in the present embodiment, the apparatus 110 for defending against attacks includes: an acquisition module 1101, a processing module 1102, and a determination module 1103.

Where, the acquisition module 1101 is configured to acquire an instruction set, and the instruction set includes: at least one instruction for controlling the state of the vehicle;

the processing module 1102 is configured to compare each instruction in the instruction set with at least one attack instruction in the attack behavior knowledge base respectively to determine the maximum similarity value corresponding to each instruction, and each attack instruction is acquired by performing attack analysis on the chained data set of at least one on-board component; and the determination module 1103 is configured to determine a type of the instruction and processing tactics for the instruction according to the maximum similarity value corresponding to the instruction and the preset similarity range for any instruction in the instruction set.

In a possible design of the present disclosure, the determination module 1103 is specifically configured to:

in case that the maximum similarity value corresponding to the instruction is greater than or equal to the upper limit of the preset similarity range, determine that the type of the instruction is an illegal instruction and the processing tactics for the instruction is blocking;

in case that the maximum similarity value corresponding to the instruction is less than the lower limit of the preset similarity range, determine that the type of the instruction is a safe instruction and the processing tactics for the instruction is running;

in case that the maximum similarity value corresponding to the instruction is less than the upper limit of the preset similarity range and greater than or equal to the lower limit of the preset similarity range, determine that the type of the instruction is a suspicious instruction and the processing tactics for the instruction is to make a second determination on the suspicious instruction.

In a possible implementation, the determination module 1103 is further configured to determine a data set corresponding to the suspicious instruction after the type of the instruction has been determined as a suspicious instruction, and the data set includes: source data corresponding to the suspicious instruction, associated data of the source data and the vehicle inspection report; and in this possible design, referring to FIG. 11, the apparatus 110 for defending against attacks may further include: a transceiver module 1104;

the transceiver module 1104 is further configured to send the data set to cloud server, and receive the attack analysis result of the suspicious instruction from the cloud server, where the attack analysis result is determined by analyzing the chained data corresponding to the suspicious instruction by the cloud server based on the data set;

the determination module 1103 is further configured to determine whether the type of the suspicious instruction is an illegal instruction or a safe instruction, according to the attack analysis result of the suspicious instruction.

In the embodiment of the present disclosure, the transceiver module 1104 is further configured to receive update information sent by the cloud server, where the update information includes update content for the attack behavior knowledge base and/or update content of the scanning module in the on-board terminal; and the processing module 1102 is further configured to update the attack behavior knowledge base and/or the scanning module in the on-board terminal according to the update information.

In another possible design of the present disclosure, the acquisition module 1101 is specifically configured to acquire an external data set, where the external data set includes at least one of the following information: information collected by the on-board infotainment system IVI, information collected by the on-board T-BOX, and information collected by the CAN gateway; and the processing module 1102 is further configured to preprocess the external data set to acquire the standardized instruction set.

The apparatus provided in the embodiment of the present disclosure can be configured to implement the solution of the on-board terminal in any of the above method embodiments, where implementation principles and technical effects are similar and will not be repeated here.

Figure 12:
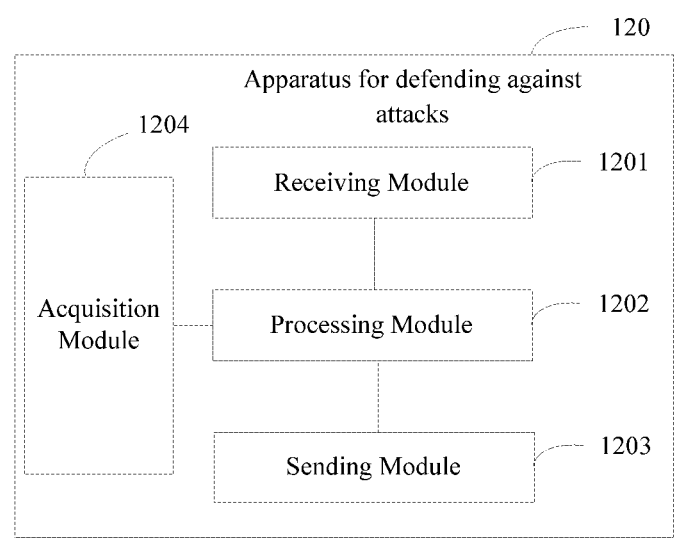
FIG. 12 is a schematic structural diagram of an apparatus for defending against attacks provided by the second embodiment of the present disclosure.

FIG. 12 is a schematic structural diagram of an apparatus for defending against attacks provided by the second embodiment of the present disclosure. The apparatus can be integrated into a cloud server or implemented by a cloud server. As shown in FIG. 12, in the present embodiment, the apparatus 120 for defending against attacks may include: a receiving module 1201, a processing module 1202, and a sending module 1203.

Where, the receiving module 1201 is configured to receive a data set sent by the on-board terminal, and the data set includes: source data corresponding to at least one suspicious instruction, associated data of the source data, and a vehicle inspection report;

the processing module 1202 is configured to, for each suspicious instruction, analyze the chained data of the suspicious instruction based on the source data corresponding to the suspicious instruction, associated data of the source data, and the vehicle inspection report, so as to determine the attack analysis result of the suspicious instruction, where the attack analysis result is used to indicate whether the suspicious instruction is actually an illegal instruction or a safe instruction; and the sending module 1203 is configured to send the attack analysis result of the suspicious instruction to the on-board terminal.

In a possible design of the embodiment of the present disclosure, the processing module 1202 is specifically configured to:

determine entry information, indication information, and impact information on the vehicle corresponding to the suspicious instruction, according to the source data corresponding to the suspicious instruction and associated data of the source data; and determine the attack analysis result of the suspicious instruction according to the entry information, indication information corresponding to the suspicious instruction, and impact information on the vehicle.

In another possible design of the embodiment of the present disclosure, the processing module 1202 is further configured to generate update information according to the attack analysis result of the at least one suspicious instruction, where the update information includes update content of an attack behavior knowledge base and/or update content of the scanning module in the on-board terminal; and the sending module 1203 is further configured to send the update information to the on-board terminal.

Exemplarily, referring to FIG. 12, the apparatus 120 for defending against attacks may further include: an acquisition module 1204.

Where, the acquisition module 1204 is configured to acquire a chained data set of at least one on-board component before the processing module 1202 generates update information according to the attack analysis result of the at least one suspicious instruction, where the chained data set includes: source data collected by the corresponding on-board component and associated data of the source data;

the processing module 1202 is further configured to establish an attack behavior knowledge base model for each on-board component according to the chained data set of each on-board component, and quantify the attack behavior knowledge base model of the at least one on-board component to acquire the attack knowledge base that includes at least one attack instruction; and the sending module 1203 is further configured to send the attack behavior knowledge base to the on-board terminal.

The apparatus provided in the embodiment of the present disclosure can be used to execute the solution of the cloud server in any of the above method embodiments, where the implementation principles and technical effects are similar and will not be repeated here.

Noted that it should be understood that the division of each module of the above apparatus is only a division of logical functions, which can be fully or partially integrated into a physical entity or physically separated in actual implementation. And these modules can all be implemented in the form of software calling by processing elements; or be implemented in the form of hardware; or part of the modules can be implemented in the form of software calling by the processing elements, and part of the modules can be implemented in the form of hardware. For example, the processing module may be a separately established processing element, or it may be integrated in a chip of the above apparatus for implementation. Moreover, it may also be stored in the memory of the above apparatus in the form of program code, and be called by a certain processing element of the above apparatus to execute the functions of the above processing module. The implementation of other modules is similar. In addition, all or part of these modules can be integrated together or implemented independently. The processing element described here may be an integrated circuit with signal processing capability. In the implementation process, each step of the above method or each of the above modules can be completed by hardware integrated logic circuits in the processor element or by instructions in the form of software.

Further, according to the embodiments of the present disclosure, the present disclosure also provides an on-board terminal, a cloud server, and a computer-readable storage medium.

Figure 13:
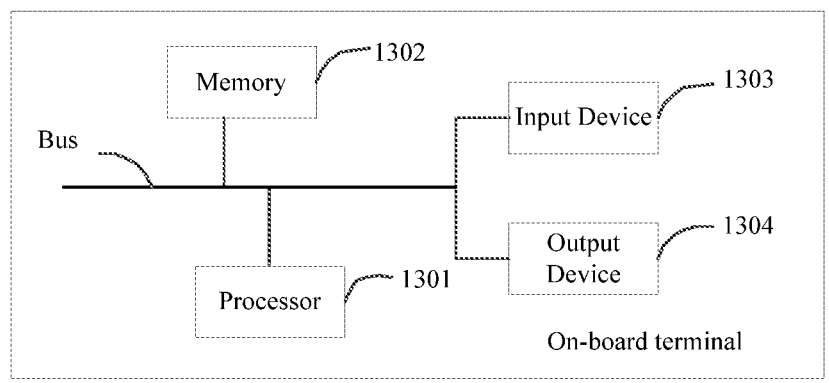
FIG. 13 is a block diagram of an on-board terminal used to implement the method for defending against attacks provided by an embodiment of the present disclosure.

FIG. 13 is a block diagram of an on-board terminal used to implement the method for defending against attacks provided by an embodiment of the present disclosure. In the embodiment of the present disclosure, the on-board terminal is represented by various forms of on-board components in the vehicle, which are terminals with processing capabilities.

Exemplarily, as shown in FIG. 13, the on-board terminal may include: at least one processor 1301, a memory 1302 communicatively connected with at least one processor 1301; where the memory 1302 stores instructions that can be executed by the at least one processor 1301; the instruction is executed by the at least one processor 1301, so that the at least one processor 1301 can execute the solution of the on-board terminal in the embodiment shown in FIG. 2 to FIG. 10.

In a possible implementation, in embodiment of the present disclosure, the on-board terminal may further include: an input apparatus 1303 and an output apparatus 1304. The processor 1301, the memory 1302, the input apparatus 1303, and the output apparatus 1304 may be connected by a bus or other methods. In FIG. 13, connecting by a bus is taken as an example.

Figure 14:
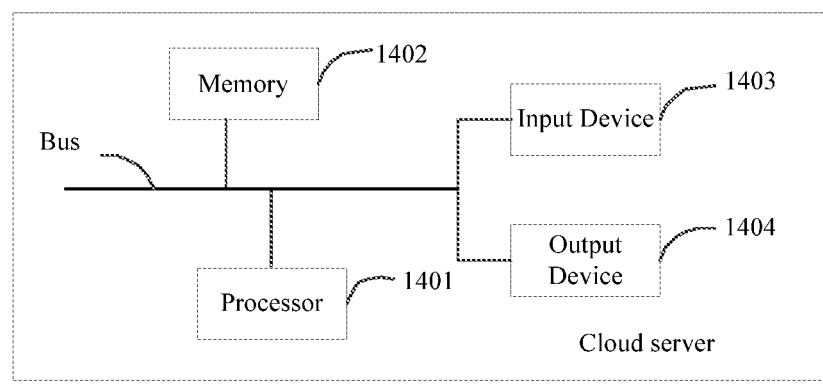
FIG. 14 is a block diagram of a cloud server used to implement a method for defending against attacks provided by an embodiment of the present disclosure.

FIG. 14 is a block diagram of a cloud server used to implement the method for defending against attacks provided by an embodiment of the present disclosure. In the embodiment of the present disclosure, the cloud server is intended to represent various forms of digital computers, such as workbenches, servers, blade servers, mainframe computers, and other suitable computing platforms.

Exemplarily, as shown in FIG. 14, the cloud server may include: at least one processor 1401 and a memory 1402 connected to the at least one processor 1401; where the memory 1402 stores instructions that can be executed by the at least one processor 1401; the instructions are executed by the at least one processor 1401, so that the at least one processor 1401 can execute the solution of the cloud server in the embodiment shown in FIG. 2 to FIG. 10.

In a possible implementation, in the embodiment of the present disclosure, the cloud server may further include: an input apparatus 1403 and an output apparatus 1404. The processor 1401, the memory 1402, the input apparatus 1403, and the output apparatus 1404 may be connected by a bus or in other ways. In FIG. 14, connecting by a bus is taken as an example.

It can be understood that the components, their connections and relationships, and their functions, shown in above FIG. 13 and FIG. 14, are merely examples, and are not intended to limit the implementation of the present disclosure described and/or required herein.

In the schematic diagrams shown in FIG. 13 and FIG. 14, both the on-board terminal and the server may further include interfaces for connecting various components, including high-speed interfaces and low-speed interfaces. The various components are connected to each other by using different buses, and can be installed on a common motherboard or installed in other ways as required. The processor can process instructions executed in the on-board terminal and the cloud server, including instructions stored in or on the memory to display graphical information of the GUI on an external input/output apparatus (such as a display device coupled to an interface). In other embodiments, if necessary, multiple processors and/or multiple buses can be used with multiple memories. Similarly, multiple devices can be connected, and each device provides some necessary operations (for example, as a server array, a group of blade servers, or a multi-processor system).

In the schematic diagrams shown in FIG. 13 and FIG. 14, the memory is the non-transitory computer-readable storage medium provided by the present disclosure. Where the memory stores instructions that can be executed by at least one processor, so that the at least one processor executes the method provided in the present disclosure. The non-transitory computer-readable storage medium of the present disclosure stores computer instructions that make the computer execute the method provided in the present disclosure.

As a non-transitory computer-readable storage medium, the memory can be used to store non-transitory software programs, non-transitory computer executable programs, and modules, such as program instructions/modules corresponding to the method for defending against attacks in the embodiment of the present disclosure. The processor executes various functional applications and data processing of the cloud server by running non-transitory software programs, instructions, and modules that are stored in the memory, that is, implements the methods in the above method embodiments.

The memory may include a program storage area and a data storage area, where the program storage area may store an operating system and an application program required by at least one function; the data storage area may store data generated by the utilization of the terminal device and/or server. Moreover, the memory may include high-speed random access memory, or non-transitory memory, such as at least one magnetic disk storage device, flash memory device, or other non-transitory solid-state storage device. In some embodiments, the memory may In a possible implementation include a memory remotely located relative to the processor, and these remote memories may be connected to the terminal device and/or the server through a network. Examples of the above networks include, but are not limited to, the Internet, corporate intranet, local area network, mobile communication network and combinations thereof.

The input apparatus can receive input digital or character information, and generate key signal input related to the user settings and function control of the terminal device and/or server, such as touch screen, keyboard, mouse, trackpad, touchpad, command stick, one or more mouse buttons, trackball, joystick and other input apparatuses. The output device may include a display device, an auxiliary lighting device (such as, LED), a tactile feedback device (such as, a vibration motor), etc. The display device may include, but is not limited to, liquid crystal display (LCD), light emitting diode (LED) display, and plasma display. In some embodiments, the display device may be a touch screen.

Various implementations of the systems and technologies described herein can be implemented in the digital electronic circuit system, integrated circuit system, application specific integrated circuit (ASIC), computer hardware, firmware, software, and/or combinations thereof. These various implementations may include: being implemented in one or more computer programs, where the one or more computer programs may be executed and/or interpreted on a programmable system including at least one programmable processor, the programmable processor can be an application specific or general-purpose programmable processor that can receive data and instructions from the storage system, at least one input apparatus, and at least one output apparatus, and send the data and instructions to the storage system, the at least one input apparatus, and the at least one output apparatus.

These computing programs (also referred to as programs, software, software applications, or codes) include machine instructions for programmable processors, and can be implemented by high-level procedures and/or object-oriented programming languages, and/or assembly/machine language. As used herein, the terms "machine-readable medium" and "computer-readable medium" refer to any computer program product, device, and/or apparatus (such as, magnetic disk, optical disk, memory, programmable logic device (PLD)) used to provide machine instructions and/or data to a programmable processor, including, machine-readable media that receive machine instructions used as machine-readable signals. The term "machine-readable signal" refers to any signal used to provide machine instructions and/or data to the programmable processor.

In order to provide interaction with the user, the system and technology described here can be implemented on a computer, where the computer is equipped with: a display apparatus for displaying information to the user (such as, CRT (cathode ray tube) or LCD (liquid crystal display) Monitor); and keyboard and pointing apparatus (such as, mouse or trackball) through which the user can provide input to the computer. Other types of apparatuses can also be used to provide interaction with the user; for example, the feedback provided to the user can be any form of sensory feedback (such as, visual feedback, auditory feedback, or tactile feedback); and input from the user can be received in any form (including acoustic input, voice input, or tactile input).

The systems and technologies described here can be implemented in computing systems (such as, data server) that include back-end components, or in computing systems (such as, application server) that include middleware components, or in computing systems (such as, a user computer with a graphical user interface or a web browser through which the user can interact with the implementation of the system and technology described herein) that include front-end components, or in computing systems that include any combination of such background components, middleware components, or front-end components and any combination thereof. The components of the system can be connected to each other through digital data communication in any form or medium (e.g., communication network). Examples of communication networks include: local area network (LAN), wide area network (WAN), and the Internet.

The computer system may include the client (on-board terminal) and cloud server. The client and the cloud server are generally far away from each other and usually interact through a communication network. The relationship between the client and the cloud server is generated by running computer programs with client-cloud server relationship on the corresponding computers.

Further, the embodiment of the present disclosure also provides a method for defending against attacks, including:

comparing the acquired external instructions with at least one attack instruction in the attack behavior knowledge base respectively, to determine whether the external instruction is an attack instruction or not; and blocking the attack instruction when it is determined that the external instruction is the attack instruction.

For the specific implementation of this solution, please refer to the records in the embodiments shown in above FIG. 2 to FIG. 10, which will not be repeated here.

According to the technical solution of the embodiments of the present disclosure, by comparing the acquired external instruction with at least one attack instruction in the attack behavior knowledge base respectively, whether the external instruction is an attack instruction or not is determined, and when the external instruction is determined as the attack instruction, the attack instruction is blocked, timely and effectively, thereby reducing the risk of the vehicle being attacked and ensuring vehicle security to a certain extent.

It should be understood that the various forms of processes shown above can be used to reorder, add or delete steps. For example, the steps described in the present disclosure can be executed in parallel, sequentially, or out of order, as long as the desired result of the technical solution disclosed in the present disclosure can be achieved, which is not limited here.

The above specific implementations do not constitute a limitation on the scope of protection of the present disclosure. Those skilled in the art should understand that various modifications, combinations, sub-combinations and substitutions can be made according to design requirements and other factors. Any modifications, equivalent substitutions and improvements made within the spirit and principles of the present disclosure shall fall into the scope of protection of the present disclosure.

What is claimed is:

1. A method for defending against attacks, executed by an on-board terminal, comprising:
   acquiring an instruction set, wherein the instruction set comprises: at least one instruction for controlling state of a vehicle;
   comparing each instruction in the instruction set with at least one attack instruction in an attack behavior knowledge base respectively to determine a maximum similarity value corresponding to each instruction, wherein each attack instruction is acquired by performing attack analysis on a chained data set of at least one on-board component; and
   for any instruction in the instruction set, determining a type of the instruction and processing tactics for the instruction according to the maximum similarity value corresponding to the instruction and a preset similarity range;
   wherein, the determining a type of the instruction and processing tactics for the instruction according to the maximum similarity value corresponding to the instruction and a preset similarity range, comprises:
   determining that the type of the instruction is an illegal instruction and the processing tactics for the instruction is blocking, in case that the maximum similarity value corresponding to the instruction is greater than or equal to an upper limit of the preset similarity range;
   determining that the type of the instruction is a safe instruction and the processing tactics for the instruction is running, in case that the maximum similarity value corresponding to the instruction is less than a lower limit of the preset similarity range; and
   determining that the type of the instruction is a suspicious instruction, and the processing tactics is to make a second determination on the suspicious instruction, in case that the maximum similarity value corresponding to the instruction is less than the upper limit of the preset similarity range and greater than or equal to the lower limit of the preset similarity range;
   wherein, after the determining that the type of the instruction is a suspicious instruction, and the processing tactics is to make the second determination on the suspicious instruction, the method further comprises:
   determining a data set corresponding to the suspicious instruction, wherein the data set comprises: source data corresponding to the suspicious instruction, associated data of the source data, and a vehicle inspection report;
   sending the data set to a cloud server;
   receiving an attack analysis result of the suspicious instruction from the cloud server, wherein the attack analysis result is determined by the cloud server through analyzing chained data corresponding to the suspicious instruction based on the data set; and
   determining whether the type of the suspicious instruction is the illegal instruction or the safe instruction according to the attack analysis result of the suspicious instruction, wherein the processing tactics for the illegal instruction is blocking, and the processing tactics for the safe instruction is running;
   wherein the attack analysis result is determined by the cloud server according to entry information corresponding to the suspicious instruction, indication information corresponding to the suspicious instruction and impact information of the suspicious instruction on the vehicle corresponding to the suspicious instruction;
   wherein the entry information, the indication information and the impact information are determined according to the source data corresponding to the suspicious instruction, the associated data of the source data and the vehicle inspection report;
   wherein the entry information comprises entry point information and entry mode information, the indication information comprises a purpose of execution and scope of action of the suspicious instruction, the indication information is determined according to the entry point information, the impact information comprises device data deletion and vehicle control instruction forging.

2. The method of claim 1, further comprising:
   receiving update information sent by the cloud server, wherein the update information comprises update contents of the attack behavior knowledge base and/or update contents of a scanning module in an on-board terminal;
   updating, according to the update information, the attack behavior knowledge base and/or the scanning module in the on-board terminal.

3. The method of claim 1, wherein the step of acquiring the instruction set comprises:
- acquiring an external data set, wherein the external data set comprises at least one of following information: information collected by an on-board infotainment system IVI, information collected by an on-board T-BOX and information collected by a CAN gateway;
- preprocessing the external data set to acquire a standardized instruction set.

4. A non-transitory computer-readable storage medium having computer instructions stored thereon, wherein the computer instructions are used for causing a computer to execute the method of claim 1.

5. An apparatus for defending against attacks, comprising at least one processor; and
- a memory communicatively connected with the at least one processor; wherein, the memory stores instructions executable by the at least one processor, and the instructions are executed by the at least one processor to enable the processor to implement operations comprising:
- acquiring an instruction set that comprises: at least one instruction for controlling state of a vehicle;
- comparing each instruction in the instruction set with at least one attack instruction in an attack behavior knowledge base respectively to determine a maximum similarity value corresponding to each instruction, wherein each attack instruction is acquired by performing attack analysis on a chained data set of at least one on-board component; and
- with regard to any instruction in the instruction set, determining a type of the instruction and processing tactics for the instruction according to the maximum similarity value corresponding to the instruction and a preset similarity range;
- wherein the at least one processor is further enabled to implement operations comprising:
- determining that the type of the instruction is an illegal instruction and the processing tactics for the instruction is blocking, in case that the maximum similarity value corresponding to the instruction is greater than or equal to an upper limit of the preset similarity range;
- determining that the type of the instruction is a safe instruction and the processing tactics for the instruction is running, in case that the maximum similarity value corresponding to the instruction is less than a lower limit of the preset similarity range; and
- determining that the type of the instruction is a suspicious instruction, and the processing tactics for the instruction is to make a second determination on the suspicious instruction, in case that the maximum similarity value corresponding to the instruction is less than the upper limit of the preset similarity range and greater than or equal to the lower limit of the preset similarity range;
- wherein the at least one processor is further enabled to implement operations comprising:
- determining a data set corresponding to the suspicious instruction after the type of the instruction is determined as the suspicious instruction, and the data set comprises:
- source data corresponding to the instruction, associated data of the source data and a vehicle inspection report;
- sending the data set to a cloud server;
- receiving an attack analysis result of the suspicious instruction from the cloud server, wherein the attack analysis result is determined by the cloud server through analyzing chained data corresponding to the suspicious instruction based on the data set; and
- determining whether the type of the suspicious instruction is the illegal instruction or the safe instruction according to the attack analysis result of the suspicious instruction, wherein the processing tactics for the illegal instruction is blocking, and the processing tactics for the safe instruction is running;
- wherein the attack analysis result is determined by the cloud server according to entry information corresponding to the suspicious instruction, indication information corresponding to the suspicious instruction and impact information of the suspicious instruction on the vehicle corresponding to the suspicious instruction;
- wherein the entry information, the indication information and the impact information are determined according to the source data corresponding to the suspicious instruction, the associated data of the source data and the vehicle inspection report;
- wherein the entry information comprises entry point information and entry mode information, the indication information comprises a purpose of execution and scope of action of the suspicious instruction, the indication information is determined according to the entry point information, the impact information comprises device data deletion and vehicle control instruction forging.

6. The apparatus of claim 5, wherein the at least one processor is further enabled to implement operations comprising:
- receiving update information sent by the cloud server, and the update information comprises update contents of the attack behavior knowledge base and/or update contents of a scanning module in an on-board terminal; and
- updating the attack behavior knowledge base and/or the scanning module in the on-board terminal according to the update information.

7. The apparatus of claim 5, wherein the at least one processor is further enabled to implement operations comprising:
- acquiring an external data set, wherein the external data set comprises at least one of following information: information collected by an on-board infotainment system IVI, information collected by an on-board T-BOX and information collected by a CAN gateway; and
- preprocessing the external data set to acquire a standardized instruction set.

8. A method for defending against attacks, executed by a cloud server, comprising:
- receiving a data set sent by an on-board terminal, wherein the data set comprises source data corresponding to at least one suspicious instruction, associated data of the source data and a vehicle inspection report, the at least one suspicious instruction having been determined by the on-board terminal: acquiring an instruction set including at least one instruction for controlling state of a vehicle; comparing each instruction in the instruction set with at least one attack instruction in an attack behavior knowledge base respectively to determine a maximum similarity value corresponding to each instruction, each attack instruction having been acquired by performing attack analysis on a chained data set of at least one on-board component; and for any instruction in the instruction set, determining a type of the instruction and processing tactics for the instruction according to the maximum similarity value corresponding to the instruction and a preset similarity range; wherein, the determining a type of the instruction and processing tactics for the instruction according to the maximum similarity value corresponding to the instruction and a preset similarity range, comprises the on-board terminal determining that the type of the instruction is a suspicious instruction, and the processing tactics is to make a second determination on the suspicious instruction, in case that the maximum similarity value corresponding to the instruction is less than an upper limit of the preset similarity range and greater than or equal to a lower limit of the preset similarity range;

for each suspicious instruction, analyzing chained data of the suspicious instruction based on the source data corresponding to the suspicious instruction, the associated data of the source data and the vehicle inspection report, and determining an attack analysis result of the suspicious instruction, wherein the attack analysis result is used to indicate whether the suspicious instruction is actually an illegal instruction or a safe instruction;

sending the attack analysis result of the suspicious instruction to the on-board terminal;

wherein the analyzing chained data of the suspicious instruction based on the source data corresponding to the suspicious instruction, the associated data of the source data, and the vehicle inspection report, and determining an attack analysis result of the suspicious instruction, comprises:

determining entry information corresponding to the suspicious instruction, indication information corresponding to the suspicious instruction, and impact information of the suspicious instruction on a vehicle according to the source data corresponding to the suspicious instruction, the associated data of the source data and the vehicle inspection report; and determining the attack analysis result of the suspicious instruction according to the entry information, the indication information and the impact information on the vehicle corresponding to the suspicious instruction;

wherein the entry information comprises entry point information and entry mode information, the indication information comprises a purpose of execution and scope of action of the suspicious instruction, the indication information is determined according to the entry point information, the impact information comprises device data deletion and vehicle control instruction forging.

9. The method of claim 8, further comprising:
generating update information according to the attack analysis result of the at least one suspicious instruction, wherein the update information comprises update contents of an attack behavior knowledge base and/or update contents of a scanning module in the on-board terminal;
sending the update information to the on-board terminal.

10. The method of claim 9, before the generating update information according to the attack analysis result of the at least one suspicious instruction, the method further comprises:
acquiring a chained data set of at least one on-board component, wherein the chained data set comprises: source data collected by the corresponding on-board component and associated data of the source data;

establishing an attack behavior knowledge base model of each on-board component based on the chained data set of the each on-board component;
quantifying the attack behavior knowledge base model of the at least one on-board component to acquire the attack behavior knowledge base that comprises at least one attack instruction;
sending the attack behavior knowledge base to the on-board terminal.

11. An apparatus for defending against attacks, comprising at least one processor; and
a memory communicatively connected with the at least one processor; wherein, the memory stores instructions executable by the at least one processor, and the instructions are executed by the at least one processor to enable the processor to implement the method of claim 8;
wherein the at least one processor is further enabled to implement operations comprising:
determining entry information corresponding to the suspicious instruction, indication information corresponding to the suspicious instruction, and impact information of the suspicious instruction on a vehicle according to the source data corresponding to the suspicious instruction, the associated data of the source data and the vehicle inspection report; and
determining the attack analysis result of the suspicious instruction according to entry information, the indication information and the impact information on the vehicle corresponding to the suspicious instruction;
wherein the entry information comprises entry point information and entry mode information, the indication information comprises a purpose of execution and scope of action of the suspicious instruction, the indication information is determined according to the entry point information, the impact information comprises device data deletion and vehicle control instruction forging.

12. The apparatus of claim 11, wherein the at least one processor is further enabled to implement operations comprising:
generating update information according to the attack analysis result of the at least one suspicious instruction, and the update information comprises update contents of an attack behavior knowledge base and/or update contents of a scanning module in the on-board terminal; and
sending the update information to the on-board terminal.

13. The apparatus of claim 12, wherein the at least one processor is further enabled to implement operations comprising:
acquiring a chained data set of at least one on-board component before the at least one processor generates the update information according to the attack analysis result of the at least one suspicious instruction, wherein the chained data set comprises: source data collected by the on-board component and associated data of the source data; and
establishing an attack behavior knowledge base model of each on-board component based on the chained data set of the each on-board component, and quantifying the attack behavior knowledge base model of the at least one on-board component, so as to acquire the attack behavior knowledge base that comprises at least one attack instruction; and
sending the attack behavior knowledge base to the on-board terminal.

14. A non-transitory computer-readable storage medium having computer instructions stored thereon, wherein the computer instructions are used for causing a computer to execute the method of claim 8.

* * * * *